US010360616B2

(12) United States Patent
Lopez et al.

(10) Patent No.: US 10,360,616 B2
(45) Date of Patent: Jul. 23, 2019

(54) SYSTEM AND METHODS FOR PRIORITIZATION OF ITEMS FOR DELIVERY

(71) Applicant: Amazon Technologies, Inc., Seattle, WA (US)

(72) Inventors: Gustavo Eduardo Lopez, Seattle, WA (US); Canku Alp Calargun, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 716 days.

(21) Appl. No.: 14/665,931

(22) Filed: Mar. 23, 2015

(65) Prior Publication Data
US 2018/0240181 A1 Aug. 23, 2018

(51) Int. Cl.
G06Q 30/00 (2012.01)
G06Q 10/08 (2012.01)
G06Q 30/06 (2012.01)
G06Q 10/00 (2012.01)
G06Q 10/06 (2012.01)

(52) U.S. Cl.
CPC ......... *G06Q 30/0635* (2013.01); *G06Q 10/00* (2013.01); *G06Q 10/0832* (2013.01); *G06Q 10/0833* (2013.01); *G06Q 10/08355* (2013.01)

(58) Field of Classification Search
CPC .................................................. G06Q 30/0625
USPC ....................................................... 705/26.81
See application file for complete search history.

(56) References Cited

U.S. PATENT DOCUMENTS

| 7,437,305 B1* | 10/2008 | Kantarjiev ........ G06F 17/30902 705/7.22 |
| 2009/0048890 A1* | 2/2009 | Burgh .................... G06Q 10/04 705/7.15 |
| 2009/0307096 A1* | 12/2009 | Antonellis ........... G06Q 10/087 705/15 |
| 2012/0123812 A1* | 5/2012 | Hornbaker ............. G06Q 10/02 705/5 |
| 2013/0110754 A1* | 5/2013 | Ravindra ............... G06Q 30/02 706/46 |

(Continued)

OTHER PUBLICATIONS

Chan, F. T. S., Chung, S. H., & Choy, K. L. (2006). Optimization of order fulfillment in distribution network problems. Journal of Intelligent Manufacturing, 17(3), 307-319. doi:http://dx.doi.org/10.1007/s10845-005-0003-z (Year: 2006).*

*Primary Examiner* — Michael Misiaszek
*Assistant Examiner* — Jason B Warren
(74) *Attorney, Agent, or Firm* — Lee & Hayes, P.C.

(57) ABSTRACT

Customers may place orders for items for delivery, where merchants provide the items, and a service provider receives the orders and facilitates the delivery of the items. Upon receiving multiple orders, the orders may be prioritized based on users scores associated with users that placed the orders. An order objective for the orders may be determined and multiple fulfillment plans for each order may be generated. For a particular order, a fulfillment plan of the multiple fulfillment plans may be selected based on the order objective for that order, where the selected fulfillment plan may govern how and when the items included in the order are to be delivered to the user that placed the order. The service provider may cause the items associated with the order to be delivered to the user pursuant to the selected fulfillment plan.

20 Claims, 8 Drawing Sheets

(56) References Cited

U.S. PATENT DOCUMENTS

2015/0227890 A1* 8/2015 Bednarek ......... G06Q 10/08355
　　　　　　　　　　　　　　　　　　　705/26.81

* cited by examiner

SYSTEM AND METHODS FOR PRIORITIZATION OF ITEMS FOR DELIVERY

BACKGROUND

In addition to selling items (e.g., products, services, etc.) at a physical location, merchants may also deliver such items to consumers. Typically, merchants will deliver items to consumers on a first come, first served basis, meaning that items will be delivered based on when the corresponding orders are received. For instance, if a first user orders a first item from a merchant for delivery at a first time, and a second user orders a second item from the merchant for delivery at a second, subsequent time, the merchant will typically first deliver the first item, and then subsequently deliver the second item. Moreover, some deliveries may run late due to a variety of reasons, such as deliverer capacity, traffic, weather, etc., some of which may be predictable and avoidable. As a result, current systems configured for delivering items to consumers may result in a poor consumer experience.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
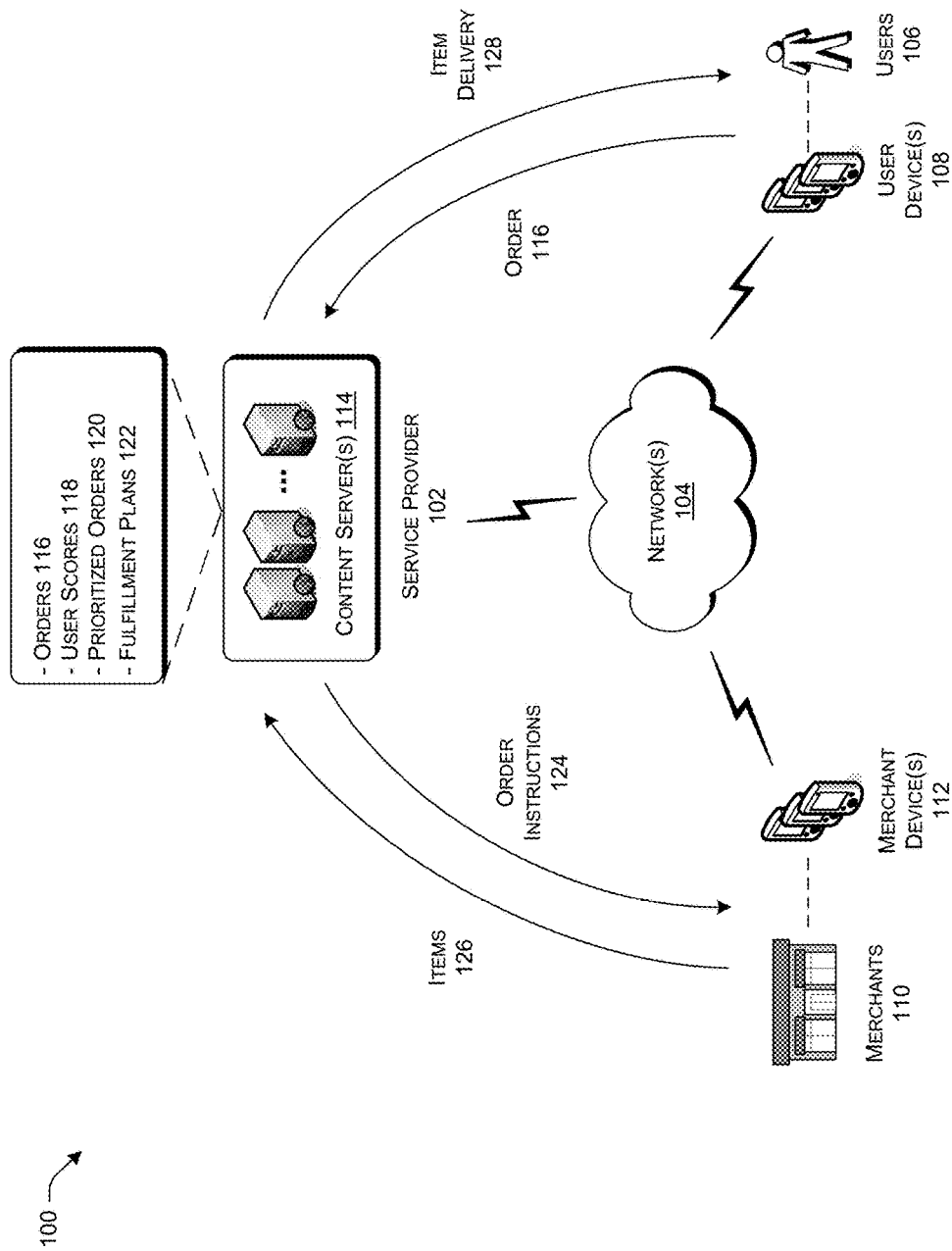
FIG. 1 is a diagram showing an example system for prioritizing item delivery and maximizing the likelihood that items are delivered on time.

This disclosure describes systems and processes for prioritizing orders for item delivery and maximizing a likelihood that items are to be delivered on time. More particularly, the systems and processes described herein may generate, maintain, and update user scores for a plurality of users. The user scores may dictate how orders for the delivery of items are prioritized with respect to other orders. A user score for a particular user may be based on a multitude of factors, such as prior orders of the user (e.g., number or prior orders, typical order size, amount spent, etc.), whether the user participates in a loyalty program, whether the user is a first-time customer, reviews previously provided by the user, and so on. The user scores for users may be updated over time as the users continue to place orders for the delivery of items.

In some embodiments, a service provider may receive, from user devices associated with users, orders for the delivery of items, where the items are provided by merchants (also referred to as "third-party merchants"). That is, although an order is placed with the service provider, the items included within the order may be fulfilled by (i.e., provided by) a merchant, and the service provider may deliver the items to the user that placed the order. Upon receiving the order, the service provider may prioritize the order and other previously received orders based on the user scores associated with the users that submitted the orders. Since a user score may indicate users that have previously done business with the service provider and/or users in which the service provider would like to make a favorable impression, the service provider may prioritize certain orders to maximize the likelihood that the items will be delivered on time.

For individual ones of the prioritized orders, and possibly for each order, the service provider may generate one or multiple fulfillment plans for the orders. A particular fulfillment plan may specify how and when the item(s) for an order are to be delivered to the user that submitted the order. For instance, each fulfillment plan may indicate the merchant that is to fulfill the order (e.g., the merchant that is to provide the item(s)), a time in which the merchant should begin preparing the item(s), a time in which the item(s) are scheduled to be picked up, the entity that is to deliver the item(s) to the user, a transportation type of the deliverer (e.g., car, bicycle, walking, unmanned aerial vehicle (UAV), etc.), the physical location where the item(s) are to be delivered, the route in which the deliver is to take to deliver the item(s), and so on. The details of each fulfillment plan for a particular order may vary, such that fulfillment plans may have different pick-up times, deliverers, transportation types, routes, etc. One of the fulfillment plans for the order may be selected based on the objective of the order, and the selected fulfillment plan may be utilized to deliver the item(s) to the user. In some embodiments, order objectives may include minimizing the delivery time of the item(s) or maximizing the likelihood that the item(s) are delivered within the time specified to the user (e.g., an estimated delivery time).

After selecting a fulfillment plan that is to be used to deliver item(s) of an order, the fulfillment plans for other orders may be updated. For instance, provided that the selected fulfillment plan utilized a resource (e.g., a deliverer) that was also part of a second fulfillment plan for a second order, the second fulfillment plan may have to be updated, or possibly nullified. That is, if the item(s) for the order are currently being delivered by a particular driver, the item(s) associated with the second order could not be delivered by the same driver at the same time. Therefore, a different fulfillment plan for the second order may have to be utilized in order to deliver the item(s) relating to the second order. In addition, as the service provider receives additional orders, the service provider may re-prioritize the orders based on the user scores for the previously received orders and the user scores associated with users that placed the newly received orders.

In some embodiments, the user scores of users may be shared with merchants that provide the items for delivery. For instance, the user scores of users that exceed a threshold may be shared with merchants. Since a higher user score for a user may indicate that the user is a better/top customer, or that the user should be favored over other customers, providing the user score to the merchant may allow the merchant to provide better service and an overall better customer experience for that user.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 illustrates an example system 100 for prioritizing orders based on user scores of users that submitted the orders, and maximizing the likelihood that items are to be delivered on time. That is, the system 100 may provide preferential treatment to certain users that have placed orders for item delivery. More particularly, the system 100 may include a service provider 102, one or more network(s) 104, one or more users 106, one or more user devices 108 associated with the users 106, one or more merchants 110, and one or more merchant devices 112 associated with the merchants 110. As shown, the service provider 102 may include one or more content server(s) 114, which may include one or more processor(s) 116 and computer-readable media 118.

In various embodiments, the service provider 102 may offer items (e.g., products, services, etc.) to users 106 via an electronic marketplace (e.g., a website) associated with the service provider 102. That is, the users 106 may access the electronic marketplace via corresponding user devices 108 for the purpose of searching for, viewing, selecting, acquiring (e.g., purchasing, leasing, renting, borrowing, lending, etc.), etc., items. The items may be provided directly by the service provider 102, or may be provided by the service provider 102 on behalf of a different entity, such as the merchants 110. In addition, users 106 may place orders to acquire items for delivery, meaning that a user 106 may submit an order and indicate that he/she would like the corresponding item(s) delivered to a physical location associated with the user 106 (e.g., a personal residence, a place of business, etc.). Delivery of the item(s) may be performed by either the service provider 102 or the merchants 106. For instance, the service provider 102 may receive the order, a merchant 110 may provide the item(s) relating to the order, and the service provider 102 may facilitate delivery of the item(s) to the user 106. That is, the service provider 102 may provide access to a centralized service that receives orders for the purchase and delivery of items, the service provider 102 may cause merchants 110 to fulfill the orders by providing the associated items, and then an individual or entity associated with the service provider 102 (or a third party) may deliver the requested items to users 106.

For the purpose of this discussion, the service provider 102 may be any entity, server(s), platform, etc., that offers items (e.g., products, services, etc.) for acquisition to consumers. For example, the service provider 102 may be associated with an electronic or merchant marketplace (e.g., a website) that allows consumers to search, browse, view and/or acquire (i.e., purchase, rent, lease, borrow, etc.) items or deals offered for sale directly by the service provider 102 or offered for sale by the service provider 102 on behalf of merchants 110 and/or other entities. The service provider 102 may also obtain/receive and maintain information, interests, preferences, etc., about the merchants 110, actual or potential customers (i.e., users 106), etc., for the purpose of presenting the most relevant items, deals, advertisements, etc., to users 106 at an appropriate time. The service provider 102 may also be associated with a plurality of entities or individuals, which may be referred to as "deliverers," that physically deliver the items to users 106.

As shown in FIG. 1, a user 106 may place an order 116 using a corresponding user device 108. In particular, the order 116 may be representative of the user acquiring (i.e., purchasing) one or more items from the service provider 102 via an electronic marketplace (e.g., a website). The user 106 may also indicate that he/she would like the item(s) to be delivered to the user 106. In some embodiments, although the items may be any product or service, and the merchant 110 may include any type of merchant 110, the order 116 may relate to food/drink items that will be fulfilled by a restaurant merchant 110. That is, the user 106 may place an order 116 with the service provider 102 to deliver food prepared by a particular restaurant.

In response to receiving the order 116 from the user 106, the service provider 102 may aggregate the order 116 with other previously received orders 116, which may include orders 116 for the delivery of items to be fulfilled by various merchants 110. For example, the aggregated orders 116 may be included in an order queue that includes items that are to be fulfilled by merchants 110 and delivered to customers. The service provider 102 may generate, maintain, and update user scores 118 for various users 106, such as the users 106 that placed the orders 116. As will be discussed in additional detail herein, the user score 118 for a particular user 106 may be based on many different factors, which may include previous orders 116 made by the user 106, whether the user 106 is a first-time customer, tipping history of the user 106, participation in loyalty programs or subscription-based services, an extent to which the user has viewed, selected, searched for, and/or acquired (e.g., purchased, rented, leased, borrowed, etc.), items (e.g., products, services, etc.) offered by the service provider 102, and so on. Therefore, a higher user score 118 for a user 106 may represent that the user 106 is a better/top customer, or that the user 106 should be favored or preferred in some manner. For example, a user 106 with a higher user score 118 may be a repeat customer or a customer that does a lot of business with the service provider 102. As a result, and to reward top customers, such customers may receive favorable and/or preferential treatment regarding the delivery of items ordered via the service provider 102.

Based on the user scores 118 for the users 106 that have placed the orders 116 with the service provider 102, the service provider 102 may prioritize the orders (e.g., prioritized orders 120) within the order queue. That is, the service provider 102 may assign a higher priority to orders 116 from users 106 that have higher user scores 118. The service provider 102 may want to ensure that such orders 116 are delivered as fast as possible, or are delivered on time (e.g., by a certain time, within a specified time duration, etc.). The service provider 102 may want to ensure that good/top customers and new customers receive a positive customer experience, which will likely increase the likelihood that such customers would make subsequent orders 116 with the service provider 102. That is, the service provider 102 may want to reward top customers by reducing latency for items 126 ordered for delivery, and to make a great first impression on first time customers.

After prioritizing the orders 116, the service provider 102 may generate one or multiple fulfillment plans 122 for one or more of the prioritized orders 120. For instance, for a particular order 116, the service provider 102 may generate multiple fulfillment plans 122, where each fulfillment plan 122 specifies how and when the items associated with the order 116 are to be delivered to the user 106 that placed the order 116. As will be discussed in additional detail herein, the fulfillment plans 122 may vary and specify the merchant 110 that is to fulfill the order 116, the time in which the item is to be provided by the merchant 110, an identity of who is to deliver the item (i.e., the deliverer), the route that the deliverer will take to deliver the item, and so on. Based on a variety of factors, one of the multiple fulfillment plans 122 may be selected and used to deliver the item. After selecting a fulfillment plan 122 for an order 116, the service provider 102 may provide order instructions 124 to the merchant 110 (e.g., a merchant device associated with the merchant 110) that is to fulfill the order 116, meaning the merchant 110 that is to provide the items that are included in the order 116. The order instructions 124 may identify items 126 to be provided by the merchant 110, a time in which the merchant 110 is to begin preparing the items 126, a time in which the items 126 are scheduled to be picked up by the deliverer, a time in which the items 126 should be delivered to the user 106, and so on. Pursuant to the order instructions 124, the merchant 110 may provide the items 126 to the deliverer that is to deliver the items 126 to the user 106 that placed the order 116. In some embodiments, the service provider 102 may have at least some control over how the merchant 110 prepares and provides the items 116.

The service provider 102 may then deliver the items 126 to the user 106 (e.g., item delivery 128) pursuant to the selected fulfillment plan 122 for that order 116. More particularly, prior to the deliverer picking up the items 126 provided by the merchant 110, the service provider 102 may provide delivery instructions to the deliverer (e.g., a deliverer device associated with the deliverer), which are likely to be included in the selected fulfillment plan 122. The delivery instructions may include an identity of the merchant 110 that is to fulfill the order 116, a location to pick up the items 126 (e.g., a physical location of the merchant 110), an identity and/or contact information (e.g., telephone number, e-mail address, etc.) of the user 106 that placed the order 116, a physical location in which to deliver the items 126 to the user 106, a route/directions that should be used to travel to the physical location of the user 106, one or more alternate routes, and so on. Any communications between the service provider 102, the users 106, the merchants 110, and/or the deliverer may occur via the network(s) 104, which will be discussed in additional detail with respect to FIG. 2.

Therefore, although the items 126 included in the order 116 may be provided by a merchant 106, the service provider 102 may have control over the process in which users 106 submit orders 116 and the process in which the items 126 included in the order 116 are delivered to the users 106 that placed the orders 116. The service provider 102 receives the orders 116, prioritizes the orders 116 based on users scores 118 associated with the users 106 that placed the orders 116, determines when and how the items 126 are to be delivered, informs the users 106 of when to expect delivery of the items 126 (e.g., an estimated delivery time), causes the merchants 110 to prepare and/or provide the items 126, and instructs deliverers how and when to deliver the items 126.

In some embodiments, the items 126 that are delivered to users 106 correspond to local items 126 provided by local merchants 110. In particular, the items 126 that are delivered via the service provider 102 are provided by merchants 110 that are within a predetermined distance (e.g., 1 mile, 5 miles, 10 miles, etc.) of the recipient of the items 126. That is, the physical location of the merchant 110 that is preparing or providing the items 128 is within a predetermined distance of the physical location of the user 106 that placed the order 116, and the deliverer physically transports the items 126 from the physical location of the merchant 110 to the physical location of the user 106 via automobile, bicycle, on foot, etc. An example of local delivery may include food delivery, where a user 106 orders, via the service provider 102, food from his/her favorite restaurant to be delivered to his/her home. Another example may include a user 106 ordering an appliance (e.g., a refrigerator, washer/dryer, etc.) from a local appliance store. The user 106 may place the order via the service provider 102, and the local appliance store provides the appliance to the deliverer for delivery to the user 106. Although many examples exist, an additional example may include the delivery of lumber (or other construction materials) to a construction site. A foreman of a construction company may order lumber from a local lumberyard, which then provides the lumber to a deliverer associated with the service provider 102 that delivers the lumber to the construction site. In the latter two examples (e.g., appliance and lumber), due to the size and/or weight of the items 128, the items 128 may be delivered to the user 106 via car or truck.

Figure 2:
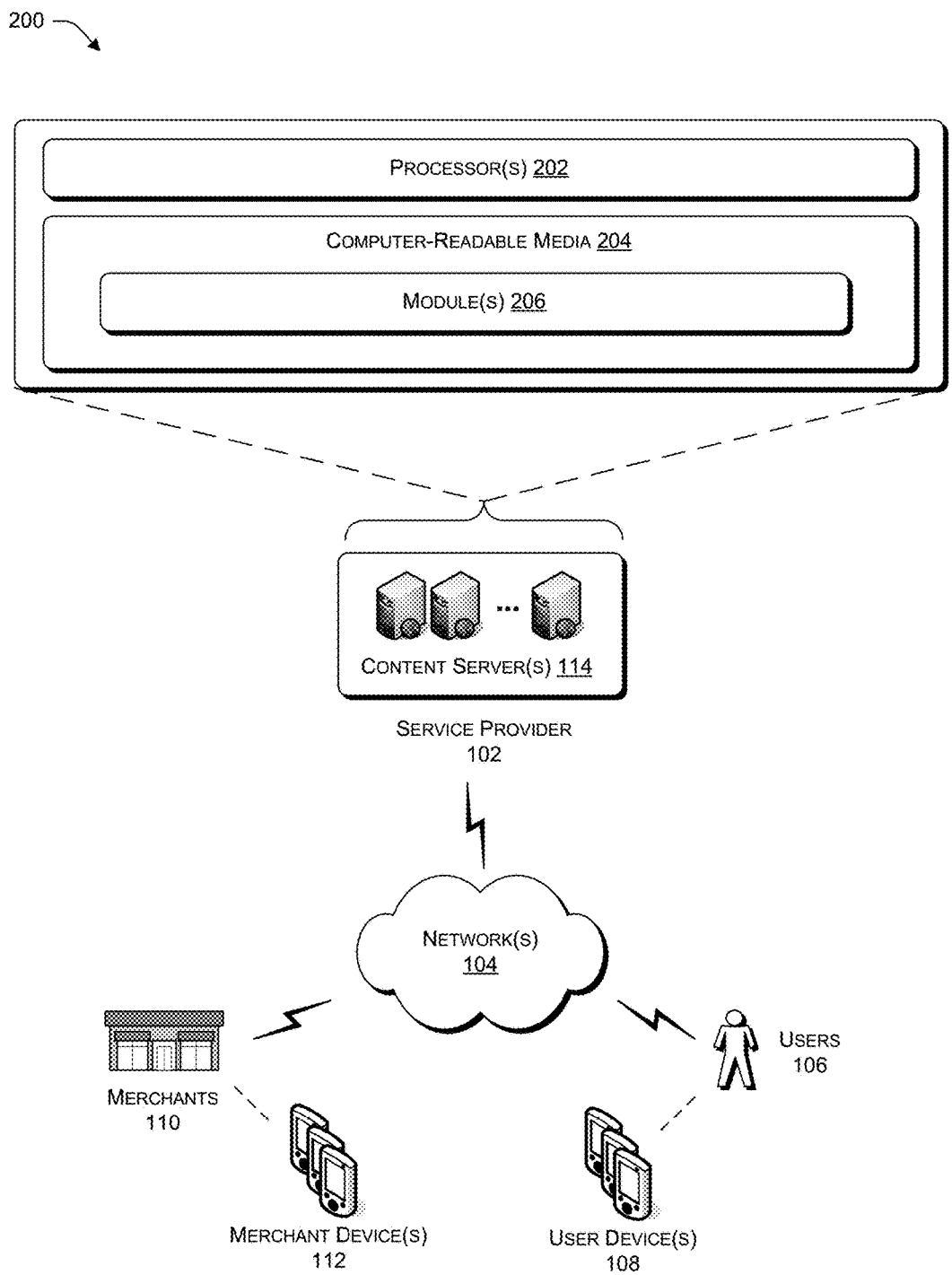
FIG. 2 is a diagram showing an example system for facilitating the delivery of items to consumers.

FIG. 2 illustrates an example system 200 for facilitating the delivery of items to users 106 that placed orders 116 via the service provider 102. As shown, the system 200 may include the service provider 102, the network(s) 104, the users 106, the user devices 108 associated with the users 106, the merchants 110, the merchant devices 112 associated with the merchants 110, and the content server(s) 114 of the service provider 102. Moreover, the content server(s) 114 may include one or more processor(s) 202, one or more computer-readable media 204, and one or more modules 206 stored by the computer-readable media 204.

In some embodiments, the service provider 102 may be a centralized service (e.g., a website) that receives orders 116 for items 126 from merchants 110, and facilitates the delivery of the items 126 to users 106 that placed the orders 116. Moreover, the network(s) 104 may be any type of network known in the art, such as the Internet. Moreover, the service provider 102, the users 106, the merchants 110, and/or the deliverers may communicatively couple to the network(s) 104 in any manner, such as by a wired or wireless connection. The network(s) 104 may facilitate communication between the content servers 114, the user devices 108 associated with the users 106, and/or the merchant devices 112 associated with the merchants 110.

In some embodiments, the users 106 may operate corresponding user devices 108 to perform various functions associated with the user devices 108, which may also include one or more processor(s), computer-readable media, and a display. Furthermore, the users 106 may utilize the user devices 108 to browse, search, view, acquire, etc., items offered for sale by the service provider 102 and/or the merchants 110. The users 106 may also use the user devices 106 to place orders 116 for the delivery of items 126 from the merchants 110, where delivery of the items 126 is performed by the service provider 102. The items may be offered to the users 106 in any manner, such as via a site (e.g., a website), an e-mail message, an application associated with a user device 108, a text message, a telephone call, a social network, or any other manner.

In various embodiments, the one or more merchants 110 may be any individual or entity that is a source or a distributor of items (e.g., products, services, etc.). For example, the merchants 110 may include entities (e.g., restaurants) that provide products or services (e.g., food items, drink items, etc.) to consumers, which may be offered or promoted directly by the merchants 110 or by the service provider 102 on behalf of the merchants 110. The merchants 110 may also offer those items via a physical location (e.g., a brick-and-mortar store) or a merchant-branded merchant site (e.g., website). The merchants 110 may provide items to the users 106 with the assistance of one or more merchant devices 112, which may include any type of device (e.g., a laptop computer, a tablet device, a mobile telephone, etc.), and which may include one or more processor(s), computer-readable media, and a display. Moreover, the merchants 110 may interact with the service provider 102 via a site (i.e., a website), a self-service merchant portal, a self-service interface, or in any other manner.

Moreover, and as shown, the service provider 102 may include one or more content servers 114, which may include the one or more processors 202 and the computer-readable media 204. The computer-readable media 204 may include, or be associated with the one or more modules 206 that perform various operations associated with the service provider 102 and/or the content server(s) 114. In some embodiments, the one or more modules 206 may include or be associated with computer-executable instructions that are stored by the computer-readable 204 and that are executable by the processor(s) 202 to perform such operations. The content servers 114 may also include additional components not listed above that may perform any function associated with the content servers 114. In various embodiments, each of the content servers 114 may be any type of server, such as a network-accessible server.

In various embodiments, the processor(s) 202 may execute one or more modules and/or processes to cause the content servers 114 to perform a variety of functions, as set forth above and explained in further detail in the following disclosure. In some embodiments, the processor(s) 202 may include a central processing unit (CPU), a graphics processing unit (GPU), both CPU and GPU, or other processing units or components known in the art. Additionally, each of the processor(s) 202 may possess its own local memory, which also may store program modules, program data, and/or one or more operating systems. Depending on the exact configuration and type of the content servers 114, the computer-readable media 204 may include volatile memory (such as RAM), non-volatile memory (such as ROM, flash memory, miniature hard drive, memory card, or the like), or some combination thereof. The computer-readable media 204 may be non-transitory computer-readable media 204.

Figure 3:
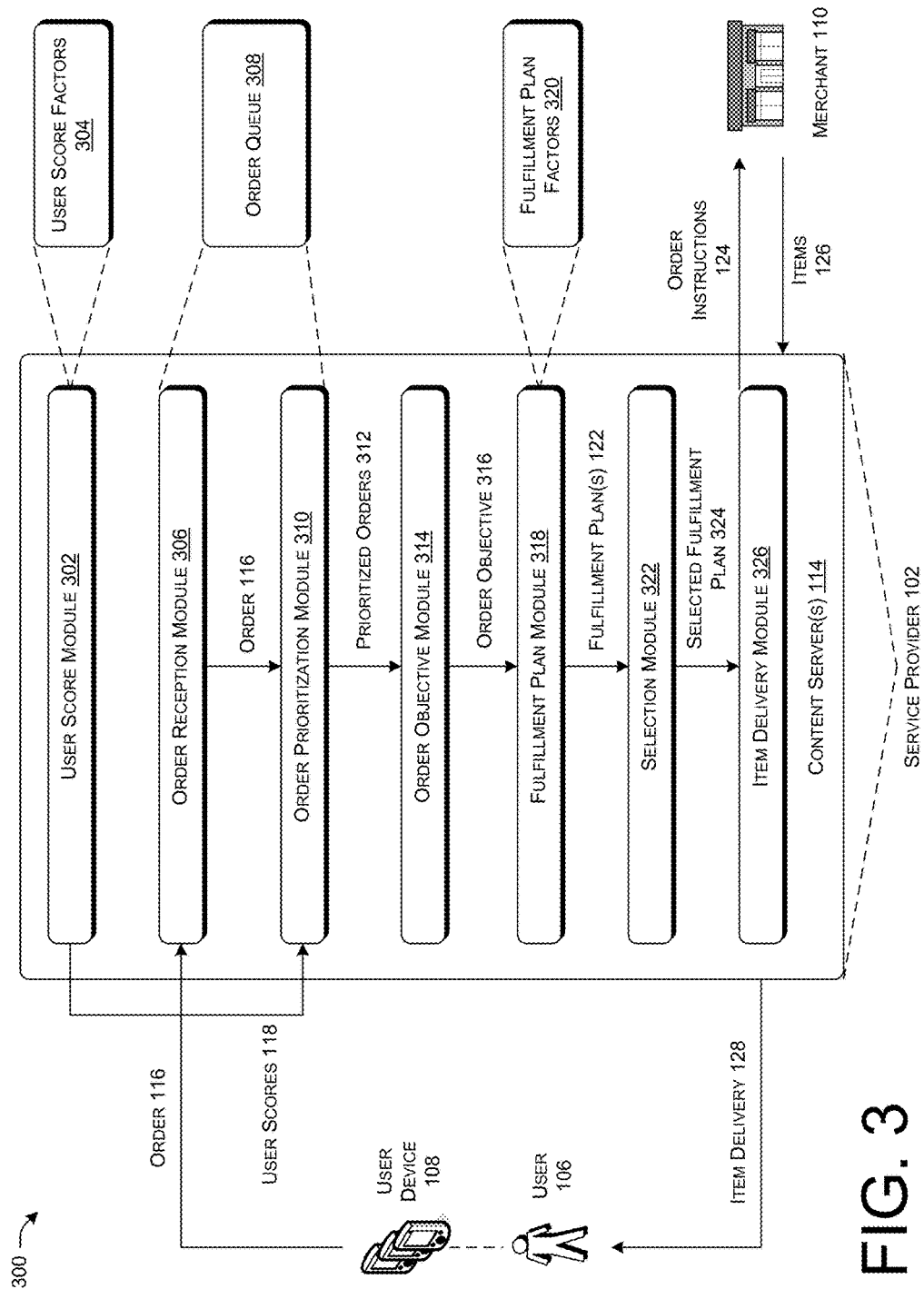
FIG. 3 is a diagram showing an example system for prioritizing item delivery and maximizing the likelihood that items are delivered on time.

FIG. 3 illustrates an example system 300 that facilitates the prioritization of orders and the delivery of corresponding items to users that placed the orders. In particular, the system 300 may include the service provider 102 and the associated content server(s) 114, a user 106 and a corresponding user device 108, and a merchant 110. The content server(s) 114 may store various modules 206 that will be discussed in additional detail with respect to FIG. 3.

In some embodiments, a user score module 302 may generate, maintain, and/or update user scores 118 for the user 106 and other users 106. Although discussed in additional detail regarding FIG. 4, the user scores 118 may be based on one or more user score factors 304. Such user score factors 304 may include previous orders 116 of the user 106, such as the number of previous orders 116, the frequency of the orders 116, typical order size (e.g., one item, five items, etc.), the amount spent on individual orders or as a whole, and so on. The user scores 118 may also be based on the extent to which users 106 have viewed, selected, searched for, acquired (e.g., purchased, leased, rented, borrowed, etc.) items (e.g., products, services, etc.) offered for sale by the service provider 102 via an electronic marketplace, such as a website associated with the service provider 102. Other user score factors 304 may include whether the user 106 is a first time customer, whether the user participates in loyalty programs or subscription-based services associated with the service provider 102, tipping history, reviews provided by the user 106, among other factors.

In various embodiments, the user score 118 for the user 106 may be a value that indicates whether that user 106 is to receive preferential or favorable treatment. For instance, users 106 that repeatedly purchase items 126 from the service provider 102, spend a significant amount of money, provide helpful reviews, interact with the service provider 102 on an ongoing basis, participate in loyalty programs or receive subscription-based services associated with the service provider 102, etc., are likely to be more valued customers from the perspective of the service provider 102, and are likely to have a higher user score 118. Since such customers are likely to be repeat customers, the service provider 102 may desire to provide those customers with exceptional customer service. The service provider 102 may also strive to make a favorable impression on new customers, such as first-time customers that have yet to engage with (e.g., acquire items from) the service provider 102. As users 106 continue to interact with the service provider 102 (e.g., acquire items, place orders 116, submit reviews, etc.), the user scores 118 for those users may increase or decrease over time.

As shown, the user 106, via his/her user device 108, may submit or place an order 116 with the service provider 102. For instance, the user 106 may place an order 116 for food items (e.g., Thai food) that are to be provided (e.g., prepared or cooked) by a merchant 110 (e.g., a Thai restaurant) and that will be delivered by the service provider 102. The user 106 may make the order using his/her user device 108 and via a website or an application that is associated with the service provider 102 and that resides on the user device 108. In the above scenario, the user 106 may be ordering Thai food for dinner for delivery to his/her family, where the Thai food may be prepared by his/her favorite Thai restaurant but delivered by an individual associated with the service provider 102. The user 106 may also be an individual representing an entity (e.g., a corporation). For instance, the order 116 may relate to a restaurant catering an event, where the service provider 102 will deliver the food to the location in which the event is taking place.

The user 106 may be an individual that has a user account or a user profile with the service provider 102. Moreover, for the purposes of this discussion, the terms "user", "user profile," and "user account" may be used interchangeably, and the user 106, the user profile, and/or the user account may be associated with one or more user devices 108. Moreover, multiple user profiles may be associated with a single user account (e.g., an adult user profile, a teen user profile, a child user profile, etc.).

The order 116 placed by the user 106 may be received by an order reception module 306. Upon receiving the order 116, the order reception module 306 may notify the user 106 of the expected/estimated delivery time. The expected delivery time may be an estimated time when the items 126 included in the order 116 are expected to be delivered (e.g., 5:00 pm), a time duration in which the items 126 are expected to be delivered within (5:00-5:30 pm), an amount of time from the time of the order 116 (e.g., 45 minutes), or a particular time in which the user 104 should receive the items 126 (e.g., no later than 5:30 pm). The orders 116 may be included within an order queue 308 that stores orders 116 previously received by the service provider 102 from various users 106. Each of the orders 106 may correspond to items 126 purchased by a particular user 106, where the items 126 are to be provided by a merchant 110 and delivered by the service provider 102.

In certain embodiments, the orders 116 within the order queue 308 may be batched based on when the orders 116 were received. In particular, orders 116 received within a particular interval (e.g., 5 minutes, 15 minutes, etc.) may be included within the same batch or group. Moreover, a batch may be based on the estimated delivery time or an estimated window in which delivery of the items 126 was promised. In this scenario, orders 116 that have estimated delivery times that are within a particular interval or time duration (e.g., 15 minutes) may be batched together. In other embodiments, however, the orders 116 within the order queue 308 need not be batched.

An order prioritization module 310 of the content server (s) 114 may prioritize the orders 116 within the order queue 308. More particularly, the orders 116 may be prioritized (i.e., prioritized orders 312) based on the user scores 118 for the users 106 that submitted the orders 116. The order prioritization module 310 may prioritize orders 116 within each batch, or may prioritize each of the orders 116 within the order queue 308 with respect to one another. In some embodiments, a first order 116 associated with a first user 106 having a higher user score 116 may be prioritized over a second order 116 associated with a second user 106 that has a lower user score 118. In this scenario, although the second order 116 may have been received prior to the first order 116, the service provider 102 may determine that the first order 116 should receive preferential treatment. For instance, the first user 106 may be a first-time user customer or the first user 106 may be a customer that frequently purchases items from the service provider 102. As a result, since the first user 106 is considered to be a good/top customer, the service provider 102 may want to deliver items 126 to the first user 106 as soon as possible or at least maximize the likelihood that the items 126 will be delivered to the first user 106 on time (e.g., within the delivery window).

In some embodiments, certain orders 116 within the order queue 308 may be downgraded or de-prioritized, which may be based on the particular users 106 that placed the orders 116. For example, if a user 106 that placed an order 116 is not likely to be a repeat customer (i.e., a one-time customer), typically requests a refund, has a poor tipping history (e.g., typically tips a low amount, or not at all), typically users promotions or coupons to receive discounts or additional items at no cost, etc., the user 106 may have a relatively low user score 118 and the order prioritization module 310 may de-prioritize orders 116 placed by that user 106. That is, since the service provider 102 may not consider the user 106 to be one of its better customers, the service provider 102 may instead prioritize orders 116 from other users 116. Although the service provider 102 may still strive to timely deliver items 126 to that user 106, the service provider 102 may value other orders 116 more highly and seek to ensure that those other orders 116 are delivered in a timely manner.

Moreover, as additional orders 116 are received and added to the order queue 308, the order prioritization module 310 may continue to prioritize the orders 116 based at least partly on the user scores 118 associated with the users 106 that placed the additional orders 116. Provided that the orders 116 are batched within the order queue 308, as additional orders 116 are received within the time interval associated with a batch, the orders 116 within that batch may be prioritized. As a result, a new order 116 from a user 106 having a high user score 118 may be placed ahead of a previously received order 116 from a user 106 having a lower user score 118. If the orders 116 within the order queue 308 are not batched, the previously received orders 116 may be prioritized and ordered with the newly received orders 116. Although the service provider 102 may make additional efforts to delivery highly ranked orders 116 in a timely manner, the service provider 102 may also strive to deliver all other orders 116 within the specified time period provided to users 106.

Upon receiving and prioritizing orders 116 received from users 106, an order objective module 314 may determine an order objective 316 for individual ones of the prioritized orders 312. The order objective 316 for a particular order 116 may represent a goal or objective associating with delivery of the item(s) 126 included in the order 116 to the user 106 that placed the order 116. For instance, an order objective 316 may be to minimize the amount of time it takes to deliver the item(s) 126 associated with the order 118. That is, the order objective 316 may be to minimize the amount of time between receiving the order 116 and delivering the item(s) 126 included in the order 116 to the user 106. A different order objective 316 may be to maximize the probability or likelihood of satisfying a delivery promise made to the user 106 when the user 106 placed the order 116. In other words, the order objective 316 may be to maximize the likelihood that the item(s) 126 included in the order 116 are delivered within a delivery window provided to the user 106 (e.g., 5:30-6:30 pm), or to maximize the likelihood that the item(s) 126 are delivered by a particular time (e.g., 5:00 pm). In this embodiment, the item(s) 126 may not be delivered as soon as possible, but the likelihood that the item(s) 126 will be delivered to user 106 in a timely manner is maximized or increased. A different order objective 316 may be to maximize the utilization of individuals that deliver the item(s) 126 (i.e., the deliverers). That is, the service provider 102 may attempt to minimize the amount of time that the deliverers are on duty but are not delivering item(s) 126.

Based at least partly on the particular order objective 316, a fulfillment plan module 318 may generate, maintain, and/or update one or more fulfillment plans 122 for previously received orders 116 included within the order queue 308. For the purposes of this discussion, a fulfillment plan 122 for an order 116 may correspond to various types of information that indicate how and when the item(s) 126 associated with the order 116 are to be delivered to the user 106 that placed the order 116. Moreover, the fulfillment plan module 318 may generate multiple fulfillment plans 122 for a particular order 116 that vary with respect to one another. For instance, different fulfillment plans 122 may vary with respect to a time in which the merchant 110 is to begin preparing the items 126 (e.g., food items), a time in which the items 126 are to be picked up by the deliverer, the identity of the deliverer that is to deliver the items 126, the type of transportation used (e.g., car, bicycle, on foot, etc.), the route used to deliver the items 126, and so on. Therefore, although each fulfillment plan 122 for an order 116 may deliver the items 126 to the user 106 in a timely manner, each fulfillment plan 122 may deliver the items 126 in a different manner, and possibly at different times.

Figure 4:
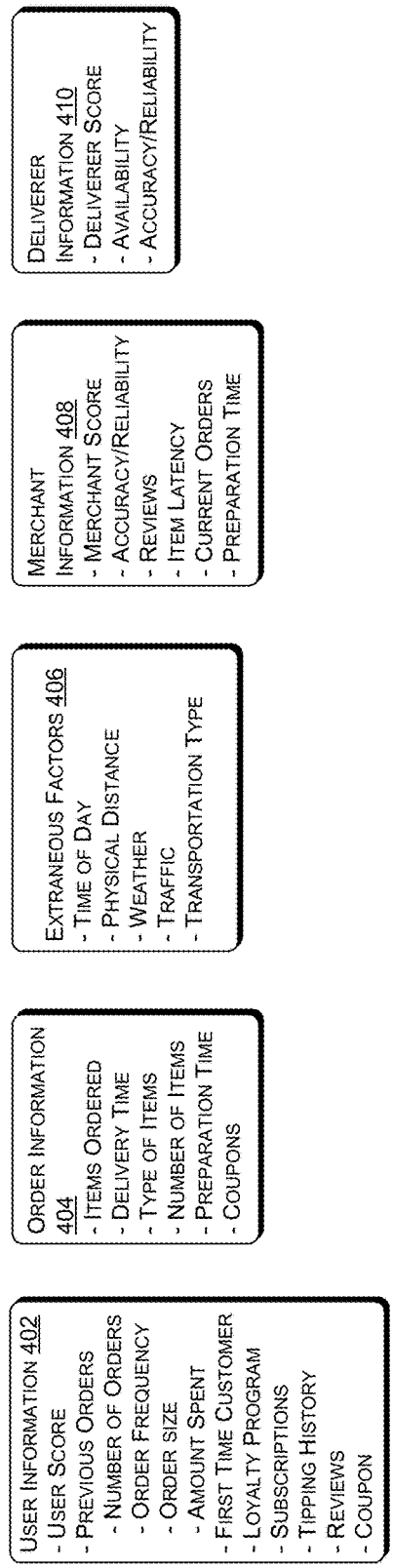
FIG. 4 is a diagram showing example factors that are considered with respect to the delivery of items to consumers.

In various embodiments, and as described in additional detail with respect to FIG. 4, the fulfillment plans 122 may be generated based on one or more fulfillment plan factors 340. Such fulfillment plan factors 320 may include information about the user 106 that placed the order 126, the order 116 itself (e.g., items 126 ordered, types of items 126, preparation time, number of items 126, etc.), information about the merchant 110 that is to provide the items 126 (e.g., a merchant score, reliability/accuracy, reviews, item latency, etc.), the deliverer (e.g., a deliver score, deliverer availability, reliability/accuracy, etc.), and/or various extraneous factors (e.g., time of day, physical distance between the merchant 110 and the user 106, weather conditions, traffic conditions, transportation type, etc.). The fulfillment plans 122 may be based on, or include, these fulfillment plan factors 320.

After generating multiple fulfillment plans 122 for a particular order 116, a selection module 322 may select one of the multiple fulfillment plans 122. The selected fulfillment plan 324 may be used to execute the delivery of the items 126 included in the order 116. The selected fulfillment plan 324 may be based at least partly on the order objective 316 determined for that order 116. For instance, the fulfillment plan 122 that is selected may be the fulfillment plan 122 that has the fastest delivery time, the fulfillment plan 122 that maximizes the likelihood that the items 126 will be delivered on time to the user 106, the fulfillment plan 122 that maximizes the use of various resources (e.g., use of deliverers), or the fulfillment plan 122 that utilizes resources that are currently available.

As stated above, the selected fulfillment plan 324 for a particular order 116 may be based on the order objective 316 determined for that order 116. For instance, provided that the order objective 316 for the order 116 is to minimize the delivery time of the items 126 included in the order 116, the service provider 102 may receive the orders 116, prioritize the orders 116 based at least partly on the user scores 118 of the users 106 that placed the orders 116, and then generate fulfillment plans 122 for each of the orders 116. For a particular order 116, the selection module 322 may select the fulfillment plan 122 that minimizes the delivery time for that order 116. That is, if the first fulfillment plan 122 indicates that delivery of the items 126 is likely to occur 35 minutes after the order 116 was received, and that a second fulfillment plan 122 indicates that the delivery of the items 126 is likely to occur 45 minutes after receiving the order 116, the selection module 322 may select the first fulfillment plan 122 even though the likelihood of delivering the items 126 on time for the first fulfillment plan 122 is lower than that of the second fulfillment plan 122. The service provider 102 may then deliver the items 126 pursuant to the first fulfillment plan 122 in order to minimize the delivery time, and therefore satisfy the order objective 316 for that order 116.

In other embodiments, the order objective 316 for an order 116 may be to maximize the likelihood that the order will be delivered on time (e.g., within a delivery window or by a specified time provided to the user 106). As a result, the service provider 102 may analyze the fulfillment plans 122 generated for that order 116 to identify factors that could potentially influence the delivery time and, therefore, cause the delivery of the items 126 included in the order 116 to be late. Such factors may include the particular deliverer that is scheduled to deliver the items 126, the scheduled route, traffic conditions, the mode of delivering the items 126, and so on. For instance, a deliverer for a particular fulfillment plan 122 for the order 116 may be more unreliable, which may be evidenced by the deliverer typically being late to pick up the items 126 and/or to deliver the items 126. Moreover, the route for a fulfillment plan 122 may have a shorter distance, but is likely to experience heavier traffic conditions (e.g., driving through a downtown area of a city, as opposed to driving on a highway around the city). Moreover, in a densely populated area, delivering the items 126 by car may generally be the quickest option, but delivering the items 126 via bicycle or on foot may be quicker due to varying traffic conditions.

Therefore, although a particular fulfillment plan 122 may not result in delivering the items 126 in the shortest amount of time, that fulfillment plan 122 may maximize the likelihood that the items 126 are delivered in a timely manner. In order to reduce the risk of not meeting a promise of delivering items 126 by a certain time, the service provider 102 may favor a more conservative fulfillment plan 122 that will still satisfy customer expectations, and avoid fulfillment plans 122 that may minimize delivery time but carry significant risk of delivering the items 126 late. Using the examples above, the selection module 322 may select a fulfillment plan 122 that uses a more reliable deliverer, uses a route that will likely avoid heavy traffic conditions (e.g., a highway as opposed to a downtown area that could become congested), and/or uses a deliverer that will deliver the items 126 via bicycle, on foot, or via UAV, as opposed to delivering by car, which could possibly take more time due to traffic conditions.

Once the selected fulfillment plan 324 is determined and the delivery of the items 126 is being executed pursuant to the selected fulfillment plan 324 (e.g., the order 116 is being fulfilled), the service provider 102 may select a fulfillment plan 122 for a subsequent order 116 included in the order queue 308. However, since fulfillment plans 122 for different orders 116 may share common resources, such as two fulfillment plans 122 utilizing the same deliverer, the fulfillment plans 122 for the subsequent order 116 may have to be updated, and possibly nullified. For example, assume that a first fulfillment plan 122 selected for a first order 116 included the same deliverer (e.g., driver) as a second fulfillment plan 122 for a second, lower priority order 116. Since that driver is currently being used to deliver item(s) 126 for the first order 116 pursuant to the first fulfillment plan 122, that driver is currently unavailable to deliver items 126 for the second order 116 pursuant to the second fulfillment plan 122. As a result, the second fulfillment plan 122 may be nullified, updated to include a different driver, or a different fulfillment plan 122 for the second order 116 that uses a different driver may be selected. Alternatively, the second fulfillment plan 122 for the second order 116 may nonetheless be selected, but delivery of the items 126 for the second order 116 may have to wait until the driver is available to deliver those items 126. In an event, the selection module 322 may select a fulfillment plan 122 for the second order 116 based at least partly on the order objective 316 for the order 116 and/or the resources that are currently available.

Upon determining the selected fulfillment plan 324, an item delivery module 326 may facilitate the delivery of the item(s) 126 of an order 116 to the user 106 that placed the order 116. More particularly, pursuant to the selected fulfillment plan 324, the item delivery module 326 may provide order instructions 124 to the merchant 110 that is to fulfill the order 116, where the order instructions 124 may be received via a merchant device 112 associated with the merchant 106. For instance, the order instructions 124 may be received via an e-mail message, a text message, a telephone call, a self-service interface associated with the service provider 102 and accessible by the merchant 110, an application associated with the service provider 102 and residing on the merchant device 112, and so on.

In various embodiments, the order instructions 124 may include information that allows the merchant 110 to provide the items 126 such that the items 126 can be delivered in a timely manner. Such information may include one or more of an identity of the items 126 that the merchant 110 is to provide, a time in which the items 126 are to be picked up by the deliverer, an identity of the deliverer, and/or a delivery time provided to the user 106. Provided that the order 116 is for food delivery by a restaurant merchant 110, the order instructions 124 may indicate the food items 126 that the restaurant is to prepare, a time in which the restaurant should begin preparing the items 126, a time that the food items 126 should be ready, an identity of the deliverer that will deliver the food items 126, and/or a time in which the user 106 expects delivery of the food items 126. In some embodiments, the merchant 110 may be unable to provide the items 126 at the time in which the deliverer is scheduled to pick up the items 126. Upon making such a determination, the service provider 102 may inform the user 106 of an updated delivery time or delivery window. In embodiments where the merchant 110 is responsible for delivering the items 110, the order information may indicate the items 126 to be provided by the merchant 110 and the delivery time, and then the merchant 110 would likely have more control over the preparation and delivery of the items 126.

In addition to providing the order information 124 to the merchant 110, some or all of the order instructions 124 may also be provided to the deliverer that is scheduled to obtain the items 126 from the merchant 110 and deliver the items 126 to the user 106 that placed the order 116. Order information 124 (also referred to "delivery instructions" when referencing the deliverer) that may be conveyed to the deliverer may include the identity of the merchant 110 that is providing the items 126, the physical location of the merchant 110, the items 126 that are scheduled to be delivered, a time in which to obtain the items 126 from the merchant 110, an identity of the user 106 that placed the order 116, a physical location that corresponds to where the items 126 are to be delivered, a route used to deliver the items 126 from the physical location of the merchant 110 to the physical location of the user 106, and/or possibly one or more alternative routes that the deliverer may take due to traffic conditions, weather, etc. The deliverer may receive the order instructions via a corresponding deliverer device, such as via an e-mail message, a text message, a telephone call, an application that is associated with the service provider 102 and that is resident on the deliverer device, and/or a self-service interface that is associated with the service provider 102 and that is accessible by the deliverer via the deliverer device.

Accordingly, pursuant to the selected fulfillment plan 324 for a particular order 116, the merchant 110 will provide the items 126 included in the order 116 to the deliverer, which may be associated or employed by the service provider 102. The deliverer may then deliver the items 126 to the user 106 that initially placed the order via the service provider 102 (i.e., item delivery 128). That is, the items 126 may be delivered to a physical location associated with the user 106, which may include a personal residence, a residence of a friend or family member, a place of business, an event venue, and so on. Upon delivering the items 126, the deliverer may confirm delivery of the items 126 to the service provider 102, such as via his/her corresponding deliverer device. At a later time, the service provider 102 may request feedback from the user 106 regarding the delivery of the order 116, and/or the user 106 may provide feedback, comments, and/or a review for the service provider 102, the merchant 110, and/or the deliverer.

FIG. 4 illustrates an example diagram 400 that identifies one or more factors that may be considered to prioritize orders for item delivery and facilitating delivery of the items pursuant to one or more fulfillment plans. More particularly, the factors illustrated in FIG. 4 may indicate how orders 116 submitted by users 106 are to be prioritized. Moreover, after determining which orders 116 should have a higher priority as compared to other orders 116, the factors may be utilized to generate, maintain, and update fulfillment plans 122 for the previously received orders 116, and to select which fulfillment plans 122 are to be used to facilitate delivery of the items 126 included in the orders 126. As shown in FIG. 4, the factors may include user information 402, order information 404, extraneous factors 406, merchant information 408, and deliverer information 410.

In particular, the user information 402 may include various information to determine a user score 118 for a user 106 and to determine how to prioritize orders 116 placed by various users 106. As stated above with respect to FIGS. 1-3, the user score 118 may be a value that indicates how an order 116 placed by a user 106 should be prioritized amongst other orders 116. That is, a first order 116 placed by a first user 106 having a first user score 118 may be prioritized over a second order 116 placed by a second user 106 having a second user score 118 that is lower than the first user score 118. As a result, the first order 116 may be fulfilled and the corresponding items 126 may be delivered prior to the second order 116. Moreover, various information associated with a particular user 106 may be considered when generating and/or updating the user score 118 for that user 106.

For instance, the previous orders placed by a user 106 may be considered. This information may include the number of orders 116 previously placed with the service provider 102 (i.e., number of orders), the frequency in which the orders 116 were placed (i.e., order frequency), the typical or average order size (i.e., order size), times and/or days in which the orders 116 were placed, and/or the amount spent on previous orders 116 (i.e., amount spent). The amount spent may include the amount spent for each particular order 116, the average amount spent for previous orders 116, and/or the total amount spent for some or all of the previous orders 116. The extent to which the user 106 has placed orders 116 with the service provider 102 may influence the user score 118 for that user 106. For instance, a user 106 that has placed a significant amount of orders 118, has placed orders 118 relatively frequently, has typically spent a considerable amount on such orders 118, etc., may be considered a good/top customer. As a result, that user 106 may receive a relatively high user score 118, and subsequent orders 118 from that user 106 may be prioritized over orders 118 from users 106 that have not had the same level of interaction/engagement with the service provider 102. As the user 106 continues to place orders 116 with the service provider 102, the user score 118 may be updated, possibly in real-time or near real-time.

The user information 402 may also include whether a user 106 that has placed an order is a first time customer, such as a user 106 that has yet to place an order 116 with the service provider 102 for the delivery of items 126. Although a first time customer does not have the same track record as a user 106 that frequently interacts with the service provider 102, the service provider 102 may want to make a favorable impression with that user 106. As a result, the service provider 102 may favor or prioritize orders 116 from new customers in order to ensure that items 126 are of good quality and are delivered in a timely manner, which may create a positive customer experience for the user 106, and which may cause the user 106 to become a repeat customer and place subsequent orders 116 with the service provider 102.

In additional embodiments, the user information 402 may include whether the user 106 participates in one or more loyalty programs and/or subscription-based services associated with the service provider 102. In particular, if the user 106 receives some sort of value (e.g., points, credit, etc.) as a result of acquiring items via the service provider 102 (e.g., a loyalty program), or receives a discount or other benefits as a result of a subscription with the service provider 102, the service provider 102 may consider that user 106 to be a good/top customer. As a result, that user 106 may have a higher user score 118 and receive preferential treatment with respect to the delivery of items 126. The user 106 may also have a higher user score 118 if he/she submits reviews for items provided by the service provider 102. The user score 118 may be based on the number of reviews, the frequency of reviews, whether the reviews are helpful to other customers, whether the reviews are favorable, and so on.

The user information 402 may also include other information associated with previous orders 116, such as the tipping history of the user 106 and/or the extent to which the user 106 uses promotional coupons when acquiring items from the service provider 102. If a user 106 typically tips the merchant 110 and/or the deliverer well, then that user 106 may have a higher user score 118, and vice versa. In addition, if a user 106 typically uses promotional coupons to receive discounts, additional free items, etc., the user score 118 for that user 106 may be decreased.

In additional embodiments, the user information 402 may include demographic information associated with the users 106, and the user scores 126 may be generated based at least partly on the demographic information. The demographic information may include any information associated with the users 106, such as age, gender, ethnicity, country of origin, physical location, home owner or renter, sexual orientation, education level, occupation, current employment status, income, marital status, occupation, religion, family size, number of dependents, and so on.

Another factor illustrated in FIG. 4 is the order information 404 relating to orders 118 placed by the users 106. In some embodiments, the order information 404 may be utilized to prioritize previously received orders 118, generate and/or update fulfillment plans for the orders 118, and select fulfillment plans that are utilized to facilitate delivery of the items 126 included in the orders 116. The order information 404 may include an identity of the particular items 126 that were ordered (i.e., items ordered), the delivery time or delivery window that was provided to the user 106 that placed the order 116 (i.e., delivery time), the type of items 126 (e.g., food items, the type of food items, etc.), the number of items 126 in the order 116 (i.e., number of items), the amount of time needed to prepare or provide the items 126 (i.e., preparation time), whether any coupons or promotions are being used with respect to the order 116 (i.e., coupons), the cost of the items 126 included in the order 116, the price of the items 126 included in the order 116, and/or the overall cost/price associated with the order 116.

The order information 404 may be utilized to determine the delivery time to be provided to the user 106, the order objective 316 of the order 116, and/or the fulfillment plans 118 for the order 116. For instance, with respect to the type of items 126, whether a food item is served hot or cold may impact the order objective 316 and the fulfillment plans 122. For hot food items (e.g., soup) or cold food items (e.g., a milkshake), a user 106 would likely prefer to receive the delivery as soon as possible. However, for room temperature food items, such as a salad, the delivery time would likely be less urgent. Moreover, non-food items that are not dependent upon temperature and that are not perishable may have a later delivery time, or a longer delivery window, which may be acceptable to the user 106.

Moreover, the outcome or performance with respect to a recent order 116 placed by a user 106 may influence a subsequent order 116 placed by the same user 116. For instance, if the items 126 for a previous order 116 were not delivered in a timely manner (e.g., not within the delivery window), or if the user 106 was displeased with the items 126 for some reason (e.g., the food items were not at an appropriate temperature), the service provider 102 may strive to ensure that subsequent orders 116 satisfy, and possibly exceed, the user's 106 expectations. As a result, the service provider 102 may ensure that the items 126 for a subsequent order 116 are of high quality and/or are delivered as soon as possible, and at least within the delivery window specified to the user 106. The service provider 102 may also opt to provide, to the user 106, a shorter delivery window for delivering the items 126. That is, the service provider 102 may prioritize subsequent orders 116 for that user 106 to make sure that the user 106 does not receive another poor customer experience, which could cause the user 106 to look elsewhere for the delivery of items 126.

Various extraneous factors 406 may influence the delivery time, the order objective 316 for an order 116, and/or the fulfillment plans 118 for the order 116. For instance, the time of day in which the items 126 are to be delivered (i.e., time of day) may be considered. For instance, for food delivery, the service provider 102 may want to ensure that items 126 ordered around a mealtime (e.g., lunch, dinner, etc.) are in fact delivered around that mealtime. If a user 106 ordered food items 126 for lunch, the service provider 102 would likely prioritize the order 116 so the food items 126 are delivered around lunchtime (e.g., 12:00-1:00 pm), as opposed to other times (e.g., 10:30 pm, 2:00 pm, etc.) when users 106 typically do not eat lunch. Other extraneous factors include physical distance, which may correspond to the physical distance between the physical location of the merchant 110 that is providing the items 126 and the physical location in which the items 126 are to be delivered to the user 106. Moreover, the weather (e.g., snow, heavy rain, extreme hot/cold temperatures) or traffic conditions (e.g., heavy traffic due to rush hour, an accident, construction, etc.) during delivery may impact the estimated delivery time and the time in which items 126 should be picked up by the deliverer from the merchant 110. Moreover, the transportation type of the deliverer (e.g., car, bicycle, on foot, UAV, etc.) may also impact the estimated delivery time. For instance, delivery by car (and possibly via bicycle on foot) may experience traffic, whereas delivery via a UAV may not experience such issues.

Merchant information 408 may also influence the delivery time, the order objective 316 for an order 116, and/or the fulfillment plans 118 for the order 116. Examples of the merchant information 408 may include a merchant score of the merchant 110, which may indicate the quality of the merchant 106 and the items 126 it provides. The merchant score may be based on user feedback, such as reviews, ratings, etc., or the experience of the service provider 102 interacting with the merchant 110. The merchant information 408 may also include the accuracy or reliability of the merchant 110 in providing items 126 to deliverers in a timely manner (e.g., percentage in which the merchant 110 provides items 126 by the specified pick-up time). As stated above, merchant reviews may be considered, as well as item latency of the merchant 110. The item latency may correspond to the amount of time the merchant 110 needs to provide the items 126, which may vary for food items. That is, some food items take longer to prepare than other food items. The number of current orders for a merchant 110 may also be taken into consideration. For instance, if the merchant 110 currently has a large backlog of orders it needs to fulfill, the delivery time for current and subsequent orders 116 that the merchant 110 needs to fulfill may be impacted. The merchant information 408 may also include preparation time, which may correspond to the ability of the merchant 110 to provide, prepare, cook, etc., items quickly.

FIG. 4 also illustrates deliverer information 410, which may include information associated with the individual or entity that delivers the items 126 to the user 106 pursuant to the selected fulfillment plan 324. The deliverer information 410 may include a deliverer score, which may reflect the quality of the deliverer and which may be based on user reviews of the deliverer, merchant reviews of the deliverer, and/or other ratings. The availability of the deliverer may also be considered. For instance, if a particular deliverer is currently delivering items 126 and/or is about to deliver additional items 126, the deliverer is likely not going to be available for other current or subsequent orders 116. Moreover, the accuracy or reliability of the deliverer may impact the delivery time that is provided to the user 106. This may be based on the extent to which the deliverer picks up items 126 from the merchant by the specified time and/or the extent to which the deliverer delivers items 126 to the user 106 by the specified time or within the specified delivery window.

In various embodiments, the systems and processes described herein may implement one or more algorithms, functions, or equations (e.g., a linear or non-linear function) to generate and update the user scores 118, to prioritize previously received orders 116, to generate delivery times for the orders 116, to generate and update fulfillment plans 122 for the orders 116, and/or to select a fulfillment plan 122 for an order 116 (e.g., an output of the algorithm), where the selected fulfillment plan 324 is used to facilitate delivery of the items 126 included in the order 116 to the user 106 that placed the order 16. Moreover, the factors illustrated in FIG. 4 may serve as variables or inputs for the algorithm, and may be weighted. In particular, the service provider 102 may utilize machine learning techniques or other techniques (e.g., supervised learning, unsupervised learning, regression analysis, clustering analysis, etc.) to weight the inputs to the algorithm(s). That is, machine learning techniques may seek to train the algorithm(s) based on the order objectives 316 of previous and current orders 116. By utilizing the history of prior orders 116, the inputs of the algorithm(s) may be weighted to achieve the order objective 316 of a particular order 116. The weights applied to the inputs are based on information associated with previous orders 116, since the service provider 102 is aware of the inputs (e.g., order time, items 126 included in the order 116, the merchant 110, the deliverer, etc.) and the output (e.g., whether the items 126 were delivered on time or not) of the previous orders 116).

As a result, provided that the service provider 102 has determined the order objective 316 (e.g., minimize delivery time, maximize likelihood of delivering items 126 on time, etc.) for a particular order 116, the service provider 102 may weigh the inputs of the algorithm(s) to maximize or increase the likelihood of achieving the order objective 316.

FIGS. 5-8 describe example processes of facilitating the delivery of items to users that placed orders for the items. The example processes are described in the context of the environment of FIGS. 1-4 but are not limited to those environments. The processes are illustrated as logical flow graphs, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

Figure 5:
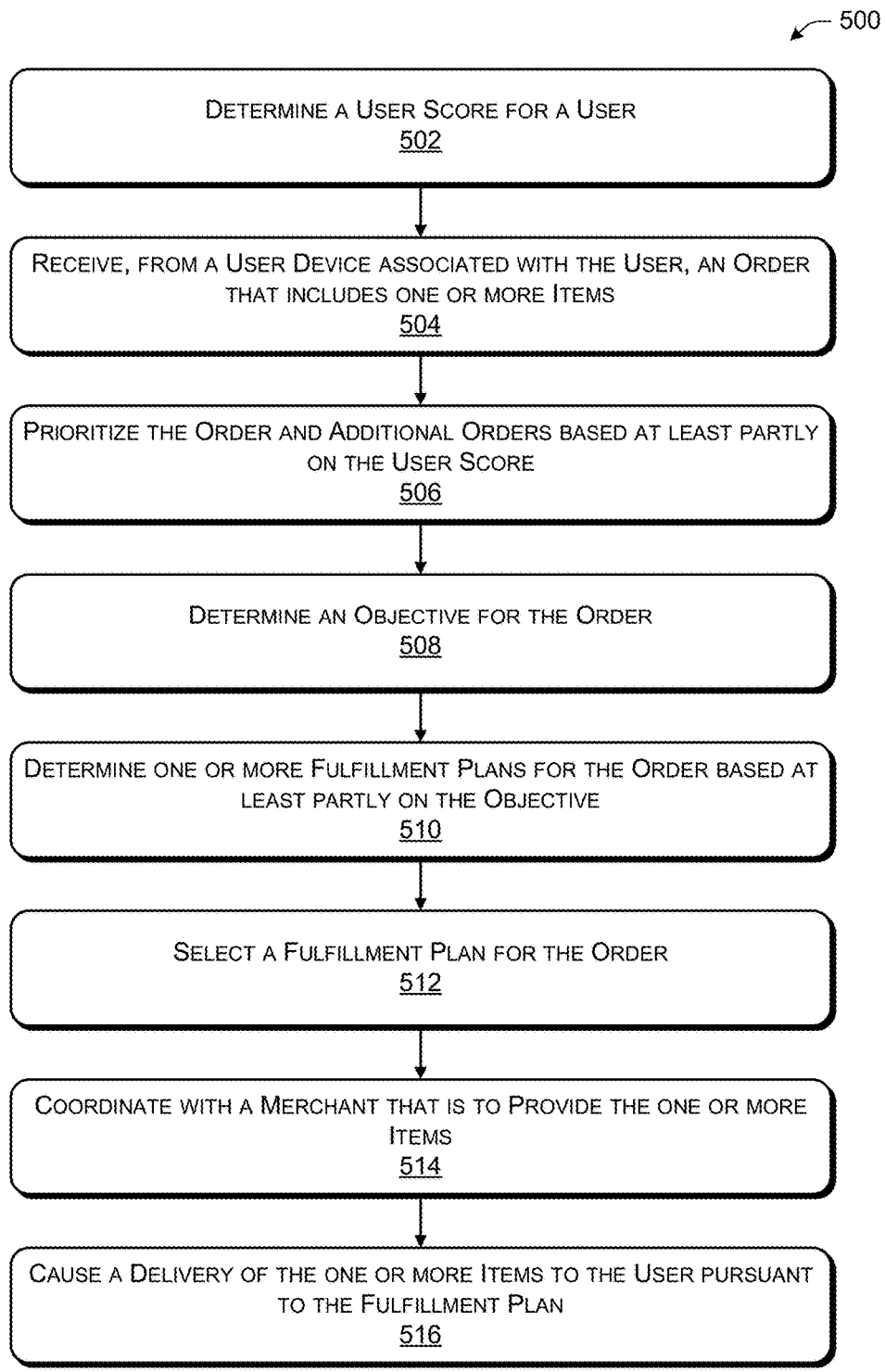
FIG. 5 is a flow diagram showing an example process of prioritizing item delivery and maximizing the likelihood that items are delivered on time.

FIG. 5 is a flow diagram illustrating an example process 500 of generating user scores for users and facilitating delivery of items based at least partly on the user scores. Moreover, the following actions described with respect to FIG. 5 may be performed by the service provider 102 and/or the content server(s) 114.

Block 502 illustrates determining a user score for a user. In various embodiments, a user score 118 may be generated, maintained, and/or updated for a user 106, where the user score 118 may be based on one or more factors, such as previous orders 116 placed by the user 106, reviews provided by the user 106, participating in loyalty programs and/or subscription-based services associated with the service provider 102, and so on.

Block 504 illustrates receiving, from a user device associated with the user, an order that includes one or more items. In particular, the user 106 may place an order 116 one or more items 126. The order 116 (e.g., acquiring food items 126 for delivery) may be placed with the service provider 102, the items 126 may be provided by a merchant 110 (e.g., a restaurant), and the items 126 (e.g., food items) may be delivered to the user 106 by a deliverer that is associated with the service provider 102.

Block 506 illustrates prioritizing the order and additional orders based at least partly on the user score. Upon receiving the order 116, the order 116 may be placed in an order queue 308 that includes other previously received orders 116 from other users 106. Based on the user scores 118 associated with the users 106 that placed the orders 116, the service provider 102 may prioritize the orders 116 to determine which orders 116 is to be delivered first.

Block 508 illustrates determining an objective for the order. In various embodiments, the service provider 102 may determine an order objective 316 for the order 116, where the order objective 316 may correspond to minimizing the delivery time for the order 116 or maximizing the likelihood that the items 126 included in the order 116 will be delivered by the specified delivery time or within the specified delivery window.

Block 510 illustrates determining one or more fulfillment plans for the order based at least partly on the objective. Based at least partly on the order objective 316, the service provider 102 may generate one or multiple fulfillment plans 122 for each order 116 included in the order queue 308. Each fulfillment plan 122 for the order 116 may specify information that indicates when and how the items 126 included in the order 116 are to be delivered to the user 106.

Block 512 illustrates selecting a fulfillment plan for the order. Moreover, based on the order objective 316, the service provider 102 may select a fulfillment plan 122 (e.g., selected fulfillment plan 324) that will be used to facilitate the delivery of the items 126 included in the order 116.

Block 514 illustrates coordinating with the merchant that is to provide the one or more items. Upon selecting the fulfillment plan 122 for the order 116, the service provider 102 may provide order instructions 124 to the merchant 110, where the order instructions 124 may indicate what items 126 to prepare/provide, a time in which to prepare the items 126, a time in which the deliverer is to pick up the items 126, and so on.

Block 516 illustrates causing a delivery of the one or more items to the user pursuant to the fulfillment plan. In various embodiments, an individual or entity (e.g., the deliverer) may pick up the items 126 from the merchant 110 and deliver the items 126 to the user 106. The deliverer may deliver the items 126 pursuant to the fulfillment plan 122 that was selected by the service provider 102.

Figure 6:
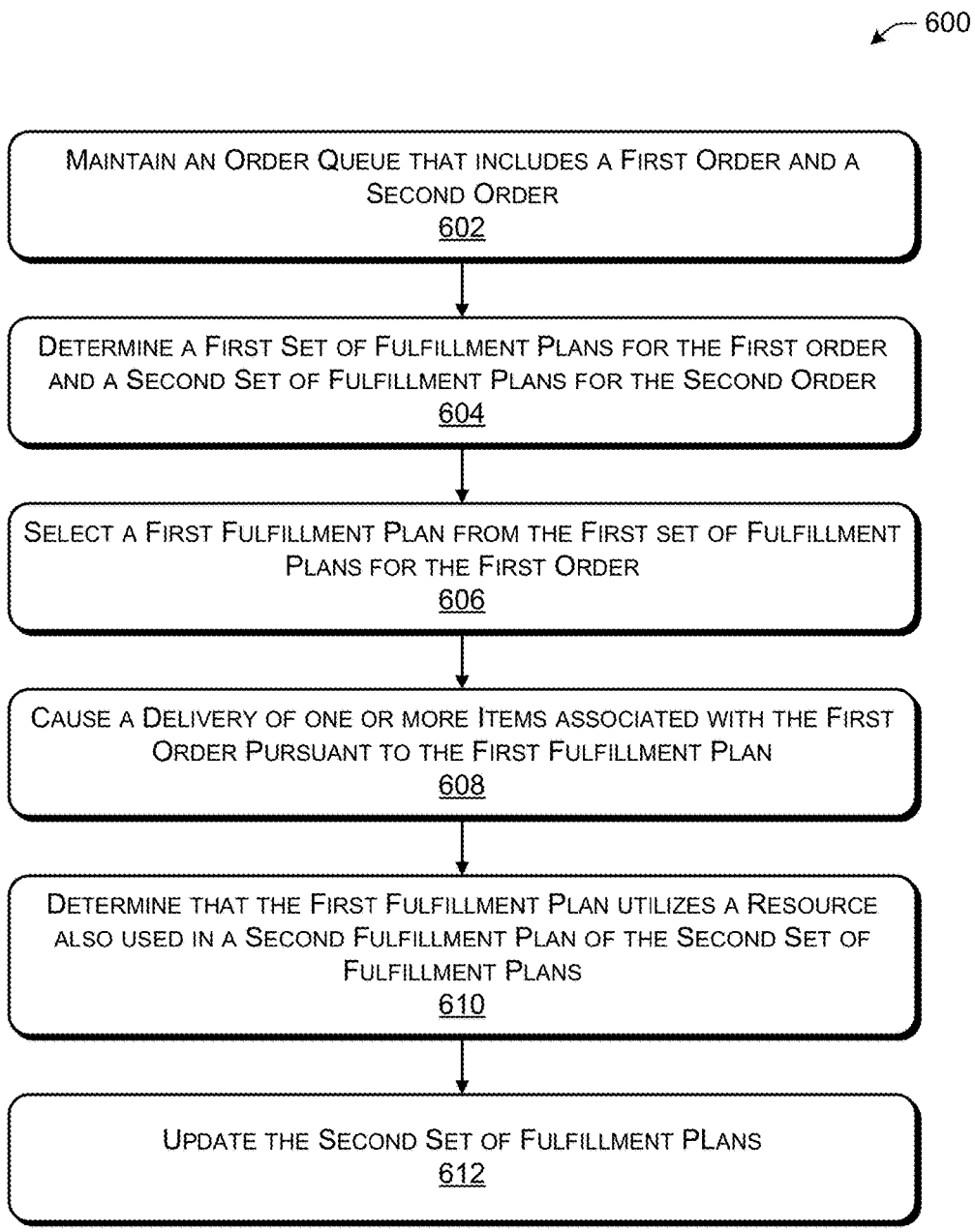
FIG. 6 is a flow diagram showing an example process of creating fulfillment plans for the delivery of items and updating fulfillment plans over time.

FIG. 6 is a flow diagram illustrating an example process 600 of generating and updating fulfillment plans for orders for the delivery of items. Moreover, the following actions described with respect to FIG. 6 may be performed by the service provider 102 and/or the content server(s) 114.

Block 602 illustrates maintaining an order queue that includes a first order and a second order. As set forth above, the service provider 102 may receive multiple orders 116 for the delivery of items 126 to be fulfilled by merchants 110. Upon receiving the orders 116, the service provider 102 may maintain the orders 116, including the first order 116 and the second order 116, in an order queue 308 that is prioritized based at least partly on user scores 118 associated with users 106 that placed the orders 118.

Block 604 illustrates determining a first set of fulfillment plans for the first order and a second set of fulfillment plans for the second order. For each of the orders 116 in the order queue 308, the service provider 102 may generate multiple fulfillment plans 122 that each set forth variations regarding how and when the items 126 included in the orders 118 are to be delivered to users 106.

Block 606 illustrates selecting a first fulfillment plan from the first set of fulfillment plans for the first order. Based at least partly on an order objective 316 for the first order 116 (e.g., minimize delivery time, maximize likelihood that items 126 will be delivered on time, etc.), the service provider 102 may select a fulfillment plan 122 (i.e., the first fulfillment plan 122) that governs the delivery of the items 126 to the user 106 that placed the first order 116. The selected first fulfillment plan 324 is determined to deliver the items 126 while also achieving the order objective 316 associated with the first order 116.

Block 608 illustrates causing a delivery of one or more items associated with the first order pursuant to the first fulfillment plan. Upon selecting the first fulfillment plan 122, the service provider 102 may cause the merchant 110 to provide the items 126 and cause the deliverer to pick up the items 126 and deliver them to the user 106.

Block 610 illustrates determining that the first fulfillment plan utilizes a resource also used in a second fulfillment plan of the second set of fulfillment plans. In various embodiments, multiple fulfillment plans 122 for different orders 116 may share common resources, such as the first fulfillment plan 122 and the second fulfillment plan 122 sharing the same deliverer (e.g., driver). As a result, while the deliverer is delivering the items 126 to the user 106 that placed the first order 116, that deliverer is currently unavailable to deliver the items 126 associated with the second order 116.

Block 612 illustrates updating the second set of fulfillment plans. As a result of determining that the deliverer is unavailable to deliver the items 126 associated with the second order 116, the service provider 102 may update the second fulfillment plan 122 to include a different deliverer. Alternatively, the service provider may nullify the second fulfillment plan 122 or wait to deliver the items 126 associated with the second order 116 until the deliverer is finished delivering the items 126 associated with the first order 116, and is therefore available for subsequent deliveries. That is, the service provider 102 may have to reallocate resources that are associated with multiple fulfillment plans 122.

Figure 7:
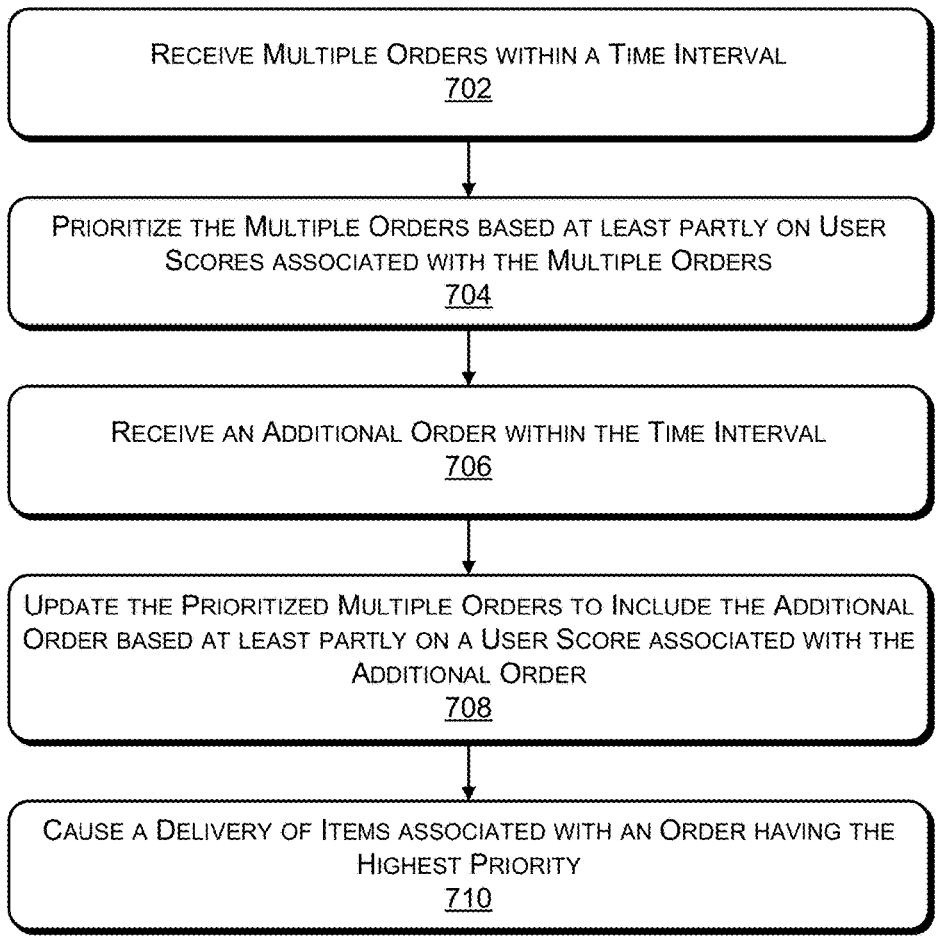
FIG. 7 is a flow diagram showing an example process of updating orders for items to be delivered to consumers based at least partly on scores associated with the consumers.

FIG. 7 is a flow diagram illustrating an example process 700 of managing orders for the delivery of items to users that placed the orders. Moreover, the following actions described with respect to FIG. 7 may be performed by the service provider 102 and/or the content server(s) 114.

Block 702 illustrates receiving multiple orders within a time interval. In various embodiments, orders 116 received by the service provider 102 within a particular time interval may be stored in an order queue 308. As a result, the orders 116 may be maintained in batches for the purpose of determining which orders 116 execute first. The time intervals may be of any duration (e.g., 2 minutes, 5 minutes, 10 minutes, etc.), and the time interval may be based on a number of orders 116 received (e.g., a threshold number of orders 116) within a particular time period.

Block 704 illustrates prioritizing the multiple orders based at least partly on user scores associated with the multiple orders. The service provider 102 may prioritize the orders 116 within the time interval/batch based on the user scores 118 of users 106 that placed the orders 116. The service provider 102 may also determine order objectives 316 for the orders 116 within the specified time interval and then generate one or more fulfillment plans 122 for each of the orders 116 based at least partly on the order objectives 316.

Block 706 illustrates receiving an additional offer within the time interval. In some embodiments, additional orders 116 may be received within the specified time interval. That is, prior to the completion of the time interval, an additional order 116 may be received and added to the orders 116 that are associated with the time interval and that are stored in the order queue 308.

Block 708 illustrates updating the prioritized multiple orders to include the additional order based at least partly on a user score associated with the additional order. Upon receiving the additional order 116, the orders 116 within the time interval/batch may be re-prioritized in view of the user score 118 associated with the user 106 that placed the additional order 116. The fulfillment plans 122 for the previously received orders 116 and the additional order 116 may be updated and generated, respectively, as a result.

Block 710 illustrates causing a delivery of items associated with an order having the highest priority. After re-prioritizing the orders 116 within the batch, the service provider 102 may cause the items 126 associated with the highest priority order 116 to be delivered to the user 106 that placed that order 116.

Figure 8:
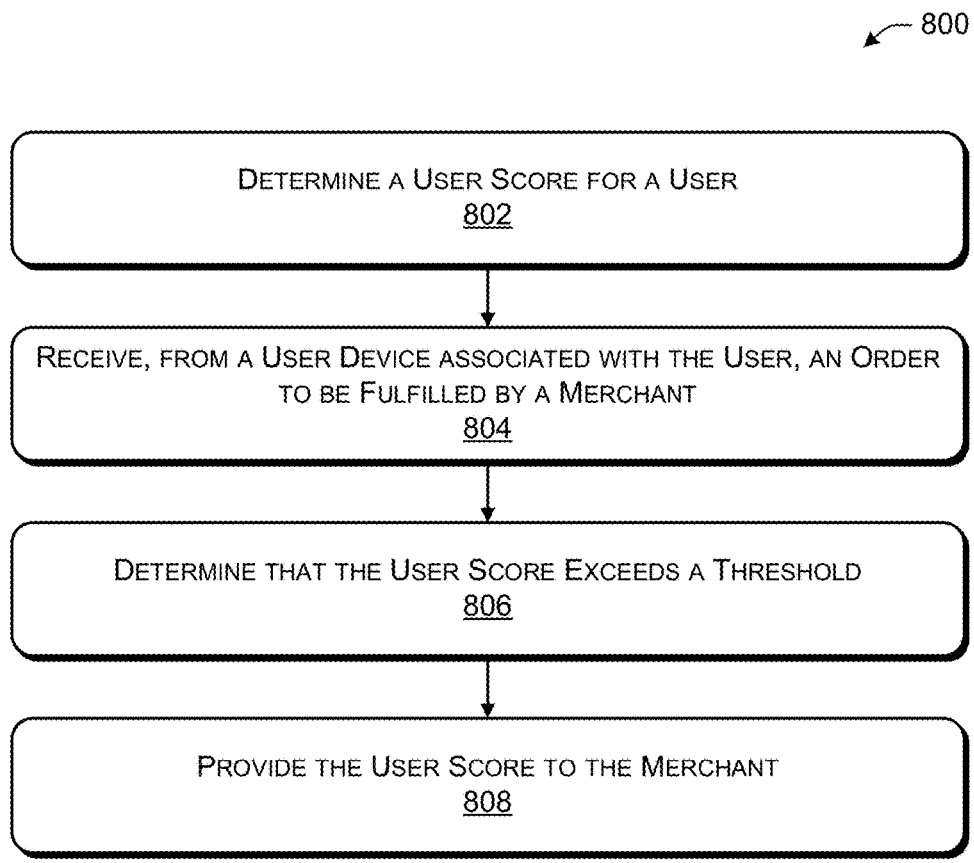
FIG. 8 is a flow diagram showing an example process of providing scores associated with consumers to merchants that fulfill orders for the delivery of items.

FIG. 8 is a flow diagram illustrating an example process 800 of sharing user scores with merchants. Moreover, the following actions described with respect to FIG. 8 may be performed by the service provider 102 and/or the content server(s) 114.

Block 802 illustrates determining a user score for a user. As set forth herein in additional detail, the service provider 102 may determine user scores 118 for users 106 based on various types of information, such as historical data relating to an extent to which the users 106 interact with the service provider 102.

Block 804 illustrates receiving, from a user device associated with the user, an order to be fulfilled by a merchant. In various embodiments, a user may place an order 116 for items 126 to be delivered to the user 106, where the merchant 110 provides the items 126, and the service provider 102 receives the order 116 and facilitate the delivery of the items 126.

Block 806 illustrates determining that the user score exceeds a threshold. In some embodiments, the service provider 102 may determine whether the user score 118 of the user 106 meets or exceeds a threshold, where the threshold may be a value that indicates whether the user 106 is a top customer of the service provider 102, and/or whether the user 106 should receive favorable or preferred treatment with respect to the previously submitted order 116.

Block 810 illustrates providing the user score to the merchant. Provided that the user score 118 of the user 106 meets or exceeds the threshold, the service provider 102 may elect to share the user score 118 of the user 106 with the merchant 110 that is fulfilling the order 116.

For typical takeout and delivery services, merchant ratings are generally shared with customers so that customers are able to make an informed purchasing decision. However, existing systems do not share ratings, scores, etc., of users 106 with the merchants 110 that are providing the delivery services. By indicating that an order 116 was placed by a top customer, such as a customer that does a significant amount of business with the merchant 106 and/or the service provider 102, the merchant 110 is able to pay particular attention to such orders 116. For instance, in order to ensure that top customers, and possibly first time customers, have a positive customer experience, the merchant 110 may favor or give preferential treatment to those users 106 by minimizing preparation and delivery time for the ordered items 126, confirming that the orders 116 are correct/accurate, confirming the quality of the items 126 being delivered, confirming that the items 128 will be delivered on time, providing additional items 126 (e.g. a dessert or appetizer) as a reward for being a top customer, and so on.

In some embodiments, the service provider 102 may determine various objectives of a particular merchant 106, such as the merchant 110 desiring customers that are loyal, repeat customers, customers that tip relatively well, customers that infrequently request refunds (e.g., customers with low refund rates), customers that do not typically use promotions, coupons, or deals, etc. The user scores 118 of the users 106 may indicate to the merchants 110 that certain users 106 are likely to satisfy the objectives of the merchant 110, which may cause the merchant 110 to provide better service to those customers. Moreover, for users 106 that had a relatively low customer experience with respect to a previous order 116, the merchant 110 may want to ensure that the user 106 receives excellent service for subsequent orders 116. That is, although the merchant 106 may be unable to spend additional time for each order 116 to confirm the accuracy, quality, timeliness, etc., of the order 116, the merchant 110 may have an incentive to perform such checks for top customers, new customers, and/or customers that are likely to be repeat/loyal customers.

In some embodiments, the merchants 110 may receive user scores 118 for all users 106 that place orders 116 for items 126 to be provided by the merchant 110. The merchants 110 may elect to de-prioritize orders 116 for users 106 that have relatively low user scores 118, such as user scores 118 that are below a second, different threshold. Since the low user scores 118 may be a result of users 106 providing poor or low quality merchant reviews, users 106 that are typically poor tippers, users 106 that frequently use promotions, coupons, deals, etc., the merchants 110 may elect to favor and provide good service to other users 106. For instance, the merchants 110 may be incentivized to provide excellent service to users 106 that provide quality reviews, provide frequent reviews, or that provide a significant number of reviews. Since the extent to which a user 106 previously provided reviews may indicate a likelihood of such users 106 providing subsequent reviews for merchants 110, which may be relatively high, the merchants 110 may want to spend additional time confirming that orders 116 for those users 106 are correct and on time.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
one or more processors;
memory; and
one or more computer-executable instructions stored in the memory and executable by the one or more processors to perform operations comprising:
receiving, from a user device associated with a user and via a website or mobile application associated with a service provider, an order for a delivery of food items to be provided by a restaurant merchant;
providing an estimated delivery time for the delivery of the food items;
aggregating, in an order queue, the order with multiple other orders for a delivery of other food items;
prioritizing the order and the multiple other orders within the order queue based at least partly on a user score associated with the user, the user score being a value that is based at least partly on prior orders placed by the user and that is adjusted over time based at least partly on subsequent interactions by the user with respect to at least one of the website or the mobile application;

determining, using a machine learning algorithm trained using order objectives for previous orders, an order objective for the order, the order objective including at least one of minimizing a delivery time for the food items or maximizing a likelihood that the food times are to be delivered by the estimated delivery time;

generating multiple fulfillment plans for the order, each of the multiple fulfillment plans specifying different plans in which the food items are to be delivered to a physical location associated with the user, the multiple fulfillment plans comprising a first fulfillment plan specifying a first restaurant merchant and a first deliverer and a second fulfillment plan specifying a second restaurant merchant and a second deliverer;

computing, based at least partly on at least one of a first reliability metric of the first restaurant merchant or a second reliability metric of the first deliverer, a first estimated delivery time for the first fulfillment plan, the first reliability metric being based at least partly on whether the first restaurant merchant provided one or more first past items by a first specified pick-up time, the second reliability metric indicating whether the first deliverer picked up one or more second past items by a second specified pick-up time;

computing, based at least partly on at least one of a third reliability metric of the second restaurant merchant or a fourth reliability metric of the second deliverer, a second estimated delivery time for the second fulfillment plan, the third reliability metric indicating whether the second restaurant merchant provided one or more third past items by a third specified pick-up time, the fourth reliability metric indicating whether the second deliverer picked up one or more fourth past items by a fourth specified pick-up time;

determining that the first estimated delivery time fulfills the order objective and that the second estimated delivery time fails to fulfill the order objective;

in response to determining that the first estimated delivery time fulfills the order objective and that the second estimated delivery time fails to fulfill the order objective, selecting the first fulfillment plan to be used to deliver the food items to the physical location associated with the user; and causing, pursuant to the first fulfillment plan, the food items to be delivered to the physical location associated with the user, the causing including at least:
  sending order instructions to a merchant device associated with the first restaurant merchant, the order instructions including at least an identity of the food items, a time in which the first restaurant merchant is to begin preparing the food items, an identity of the first deliverer, and a time in which the first deliverer is scheduled to pick up the food items; and
  sending delivery instructions to a deliverer device associated with the first deliverer, the delivery instructions including at least a physical location associated with the first restaurant merchant, the time in which the first deliverer is scheduled to pick up the food items, and the physical location associated with the user.

2. The system as recited in claim 1, wherein the operations further comprise:

determining that the order and the multiple other orders are received within a time interval;

receiving an additional order within the time interval; and re-prioritizing the order, the multiple other orders, and the additional order based at least partly on the user score, user scores associated with users that placed the multiple other orders, and an additional user score associated with an additional user that placed the additional order.

3. The system as recited in claim 1, wherein the operations further comprise:

determining that the user score meets or exceeds a threshold; and based at least partly on the determining that the user score meets or exceeds the threshold, providing the user score to the merchant device associated with the first restaurant merchant.

4. The system as recited in claim 1, wherein the operations further comprise:

determining that the first fulfillment plan utilizes a resource;

determining that a third fulfillment plan associated with a second order of the multiple other orders also utilizes the resource; and based at least partly on the selecting the first fulfillment plan, at least one of:
  nullifying the third fulfillment plan;
  updating the third fulfillment plan to replace the resource with a different resource; or
  waiting to execute the third fulfillment plan until the resource is available.

5. The system as recited in claim 1, wherein the selecting the first fulfillment plan is based at least partly on order information associated with the order, merchant information associated with the first restaurant merchant, deliverer information associated with the first deliverer, and one or more extraneous factors, the merchant information including the first reliability metric of the first restaurant merchant and the deliverer information including the second reliability metric of the first deliverer.

6. A method comprising:

receiving, by one or more computing devices associated with a service provider, a first order from a first user device associated with a first user profile and a second order from a second user device associated with a second user profile;

determining that a first user score associated with the first user profile is greater than a second user score associated with the second user profile;

prioritizing the first order over the second order based at least partly on the first user score being greater than the second user score;

computing a first estimated delivery time for a first fulfillment plan based at least partly on at least one of a first reliability metric of a merchant specified by the first fulfillment plan or a second reliability metric of a deliverer specified by the first fulfillment plan, the first reliability metric indicating whether the merchant provided one or more first past items by a first specified pick-up time, the second reliability metric indicating whether the deliverer picked up one or more second past items by a second specified pick-up time;

computing a second estimated delivery time for a second fulfillment plan;

determining that the first estimated delivery time fulfills an order objective for the first order and that the second estimated delivery time fails to fulfill the order objective for the first order;

in response to determining that the first estimated delivery time fulfills the order objective for the first order and that the second estimated delivery time fails to fulfill the objective for the first order, selecting the first fulfillment plan; and causing, based at least partly on the first fulfillment plan and delivery instructions sent from the service provider to the deliverer, a delivery of one or more items associated with the first order to a physical location associated with the first user profile.

7. The method as recited in claim 6, further comprising generating the first user score associated with the first user profile based at least partly on at least one of a determination of whether a user associated with the first user profile is a first time customer of the service provider, previous orders associated with the first user profile, reviews associated with the first user profile, participation in a loyalty program associated with the service provider, participation in a subscription-based service associated with the service provider, a tipping history associated with the first user profile, or promotions or coupons used in association with the first user profile.

8. The method as recited in claim 6, further comprising:
determining the order objective for the first order, the order objective including at least one of minimizing a delivery time for the one or more items or maximizing a likelihood that the one or more items are to be delivered by an estimated delivery time provided to a user associated with the first user profile.

9. The method as recited in claim 6, further comprising determining that the first fulfillment plan includes an identity of the deliverer, a time in which the deliverer is scheduled to pick up the one or more items from the merchant, the first estimated delivery time for delivery of the one or more items, and a route between a physical location of the merchant and the physical location associated with the user profile.

10. The method as recited in claim 6, further comprising:
determining that the first order and the second order are received within a time interval;
receiving, from a third user device associated with a third user profile, a third order within the time interval; and
re-prioritizing the first order, the second order, and the third order based at least partly on the first user score, the second user score, and a third user score associated with the third user profile.

11. The method as recited in claim 6, further comprising:
determining that the second order is received prior to the first order; and
based at least partly on the first user score being greater than the second user score:
causing delivery of the one or more items associated with the first order at a first time; and
causing delivery of one or more other items associated with the second order at a second time that is subsequent to the first time.

12. The method as recited in claim 6, further comprising:
determining that the first fulfillment plan utilizes a resource;
determining that the second fulfillment plan associated with the second order also utilizes the resource; and based at least partly on the selecting the first fulfillment plan, updating the second fulfillment plan by replacing the resource with a different resource.

13. The method as recited in claim 6, wherein the first fulfillment plan is selected based at least partly on:
order information associated with the first order, the order information including at least one of the one or more items, a type of the one or more items, a number of the one or more items, an amount of time to prepare the one or more items, or an estimated delivery time of the one or more items;
merchant information associated with the merchant, the merchant information including at least one of a merchant score associated with the merchant, previous orders fulfilled by the merchant, user reviews relating to the merchant, or a current preparation latency associated with the merchant, the merchant information including the first reliability metric of the merchant;
deliverer information associated with the deliverer, the deliverer information including at least one of a deliverer score associated with the deliverer, previous items delivered by the deliverer, or an availability of the deliverer, the deliverer information including the second reliability metric of the deliverer; and
one or more extraneous factors, the one or more extraneous factors including at least one of a time of day in which the one or more items are scheduled to be delivered, a physical distance between a physical location associated with the merchant and the physical location associated with the first user profile, weather conditions at a time in which the one or more items are scheduled to be delivered, traffic conditions at the time the one or more items are scheduled to be delivered, or a transportation type used by the deliverer.

14. The method as recited in claim 6, further comprising providing the first user score to the merchant.

15. A method comprising:
receiving, by one or more computing devices associated with a service provider, a first order from a first user device associated with a first user profile and a second order from a second user device associated with a second user profile;
determining that a first user score associated with the first user profile is greater than a second user score associated with the second user profile prioritizing the first order over the second order based at least partly on the first user score being greater than the second user score;
determining, using a machine learning algorithm trained using order objectives for previous orders, an order objective for the first order;
generating, for the first order, multiple fulfillment plans to satisfy the order objective;
selecting, based at least partly on the order objective, a first fulfillment plan of the multiple fulfillment plans, the first fulfillment plan identifying a merchant to provide one or more items associated with the first order and a deliverer to deliver the one or more items, the first fulfillment plan being selected based at least partly on an estimated delivery time associated with the first fulfillment plan, the estimated delivery time being based at least partly on at least one of a first reliability metric of the merchant or a second reliability metric of the deliverer, the first reliability metric indicating whether the merchant provided one or more first past items by a first specified pick-up time, the second reliability metric indicating whether the deliverer picked up one or more second past items by a second specified pick-up time;

computing a second estimated delivery time for a second fulfillment plan;

determining that the first estimated delivery time fulfills the order objective for the first order and that the second estimated delivery time fails to fulfill the order objective for the first order; and in response to determining that the first estimated delivery time fulfills the order objective for the first order and that the second estimated delivery time fails to fulfill the order objective for the first order, sending, by the service provider and to a deliver device associated with the deliverer, delivery instructions associated with the one or more items, the delivery instructions being associated with the first fulfillment plan.

16. The method as recited in claim 15, further comprising:

causing, based at least partly on order instructions associated with the first fulfillment plan, the merchant to provide the one or more items to the deliverer; and causing, based at least partly on the delivery instructions associated with the first fulfillment plan, the deliverer to pick up the one or more items from a physical location associated with the merchant and deliver the one or more items to a physical location associated with the first user profile.

17. The method as recited in claim 15, further comprising determining that the order objective for the first order includes at least one of minimizing the estimated delivery time for the one or more items or maximizing a likelihood that the one or more items are to be delivered by the estimated delivery time.

18. The method as recited in claim 15, further comprising determining the first user score based at least partly on at least one of:

an extent to which a user associated with the first user profile has viewed, searched for, or acquired items offered by the service provider; or order information relating to previous orders associated with the first user profile, the order information including at least one of a number of the previous orders, a frequency of the previous orders, items included in the previous orders, a type of the items included in the previous orders, or an amount spent for the previous orders.

19. The method as recited in claim 15, further comprising:

determining the estimated delivery time, the estimated delivery time being for delivering the one or more items to a physical location associated with the first user profile;

receiving a third order from a third user device associated with a third user profile;

determining that a third user score associated with the third user profile is greater than the first user score;

prioritizing the third order over the first order; and updating the estimated delivery time for delivering the one or more items.

20. The method as recited in claim 15, wherein the one or more items are food items and the merchant is a restaurant merchant, and further comprising sending order instructions to a merchant device associated with the merchant, the order instructions including an identity of the food items, a time in which to begin preparing the food items, and a time in which the deliverer is scheduled to pick up the food items.

* * * * *